May 15, 1956 J. F. CHARF ET AL 2,745,222
METHOD AND APPARATUS FOR MACHINING ARTICLES OF MANUFACTURE
Filed Aug. 27, 1952 2 Sheets-Sheet 1

INVENTORS
JAMES F. CHARF
HENRY S. HIMES
EARL E. TODD JR.
BY

ATTORNEYS

May 15, 1956  J. F. CHARF ET AL  2,745,222

METHOD AND APPARATUS FOR MACHINING ARTICLES OF MANUFACTURE

Filed Aug. 27, 1952

INVENTORS
JAMES F. CHARF
HENRY S. HIMES
EARL E. TODD JR.

BY

ATTORNEYS

United States Patent Office 2,745,222
Patented May 15, 1956

2,745,222

METHOD AND APPARATUS FOR MACHINING ARTICLES OF MANUFACTURE

James F. Charf and Henry S. Himes, Dayton, and Earl E. Todd, Jr., Covington, Ohio, assignors to General Motors Corporation, Detroit, Mich., a corporation of Delaware Application August 27, 1952, Serial No. 306,684

11 Claims. (Cl. 51—165)

The present invention relates to a method and apparatus for machining articles of manufacture and more particularly to a method and apparatus for matching cooperable elements of a valve assembly by precision machining.

Heretofore in the manufacture of valve assemblies of the type including cooperable cylinders and pistons, the cylinders having a plurality of axially and circumferentially spaced ports and the pistons having a plurality of axially spaced lands, insuperable difficulty has been encountered with the usage of conventional machining apparatus and methods in attempting to obtain dimensional exactitude between the ports of a cylinder and the lands of a piston. Accuracy in the dimensions between cooperable elements of a valve assembly is of paramount importance when the valve units are utilized in precision hydraulic equipment, such as hydraulically controlled variable pitch aircraft propellers. Accordingly, among our objects are the provision of a method of precision machining articles of manufacture, and the further provision of apparatus for effecting such precision machining.

The aforementioned and other objects are accomplished in the present invention by providing means for accurately ascertaining the requisite dimensions of a pair of cooperable elements and thereafter, machining one of the elements so that it has a predetermined dimensional relationship with respect to the other element. The dimensional relationships between the two elements may be such that the distances between reference indicia on the elements coincide with exactitude or differ a predetermined amount depending upon the use of the assembly comprising the elements. Specifically, the apparatus and method is herein exemplified in conjunction with a microform grinder, but it is apparent that the invention is capable of other adaptations. In the disclosed embodiment a machine bed having two center point type workholders is provided, the workholders being spaced in parallel vertical planes. One of the workholders is adapted for movement relative to the machine bed, and the bed is likewise supported for movement relative to its supporting structure. Two microscopes are supported on a common fixed member, with at least one of the microscopes being movable relative to the other. Each cooperable element is supported by one of the workholders in vertical alignment with one of the microscopes. An adbrading wheel is movably supported for engagement with the element to be machined, the edge of the abrading wheel also being visible through one of the microscopes.

The method of operation comprehends the following sequence of steps after initially mounting the elements in their respective workholders. The operator first aligns the cross hairs of one microscope with a reference point on the element to be machined. Thereafter, the operator adjusts the movable workholder and the movable microscope to locate a corresponding reference point on the second or template element. Subsequent to these steps, the machine bed is adjusted to move both elements simultaneously through the same distance to locate a second reference point on the second element. The operator then sights through the other microscope and manipulates the abrading mechanism so as to bring the edge of the grinding wheel into alignment with the cross hairs of the microscope associated with the first element. Thence, the machine operation may be initiated to duplicate with exactitude the distance between the two reference points on the template element and the two points on its cooperable element. Provision may also be made to obtain a dimensional relationship between points on the elements other than equality, if such a need should arise.

Further objects and advantages of the present invention will be apparent from the following description, reference being had to the accompanying drawings wherein a preferred embodiment of the present invention is clearly shown.

Although the present invention is exemplified in conjunction with the manufacture of precision valve assemblies, which include a ported cylinder and a piston having a plurality of spaced lands, it is to be understood that this is only by way of example and not by way of limitation, as the apparatus and method herein disclosed is capable of broad application to the manufacture of assemblies wherein dimensional precision is an important criteria.

Figure 1:
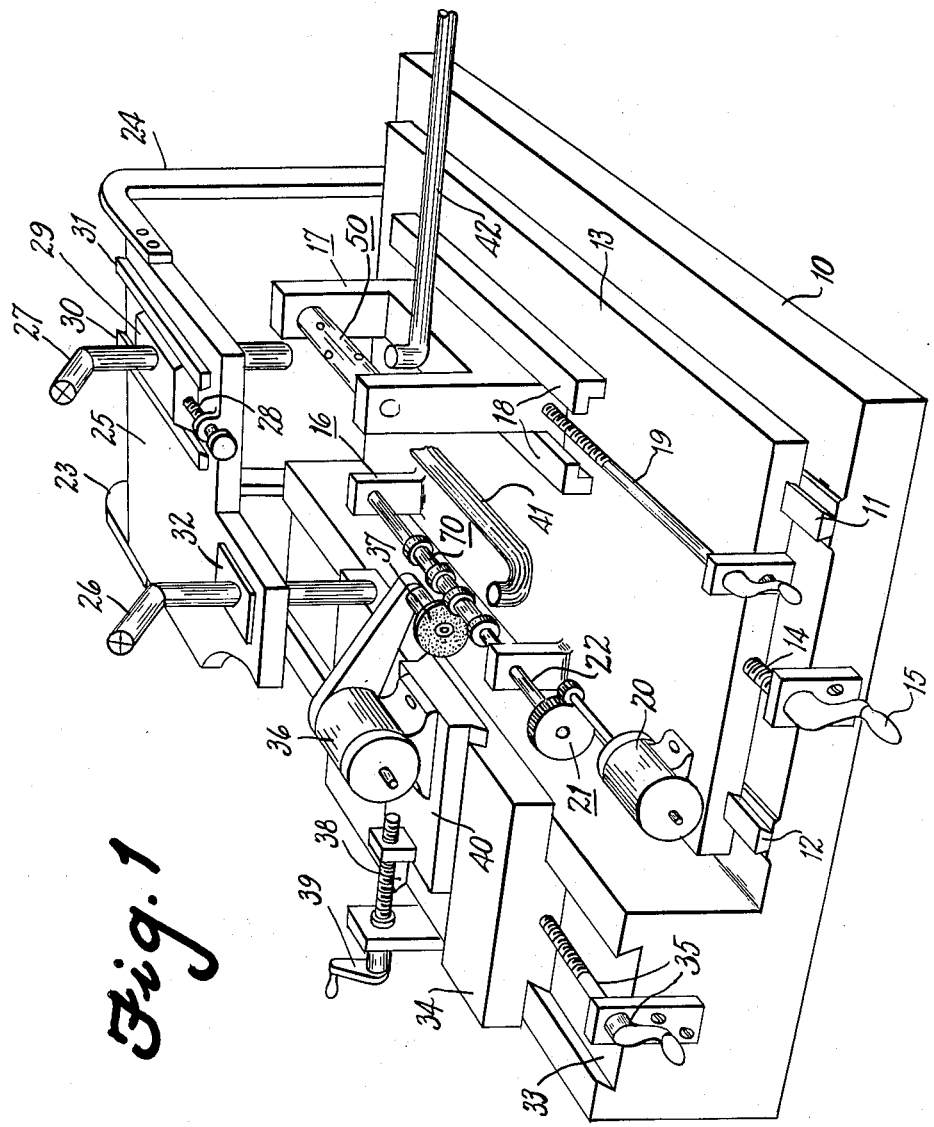
Fig. 1 is a view in perspective of apparatus constructed according to the present invention.

Referring particularly to Fig. 1, the apparatus is shown in conjunction with a microform grinder of conventional design including fixed supporting member 10 having a pair of transversely extending rails 11, 12 upon which a bed 13 may be moved through the medium of a machine screw 14 and crank mechanism 15. The machine bed provides a pair of workholders 16 and 17. The workholders are of conventional construction and include center point means, not shown, for supporting work pieces. The workholder 16 is rigidly attached to the bed 13, while the workholder 17 is adapted for movement relative to the bed by means of a slide 18 and a screw device 19, which threadedly engages the workholder. The work piece held by workholder 16 is adapted for rotation by means of an electric motor 20 through the medium of a gear train 21 and a shaft 22 suitably supported by bearings, not shown. The work pieces supported by the workholders 16 and 17 are maintained in parallel vertical planes for a reason which will later appear.

Rigidly supported above the bed 13 by means of a pair of struts 23 and 24 is a member 25, which provides support for a pair of microscopes 26 and 27. Microscope 26 is so disposed that the work piece seated in workholder 16 may be viewed therethrough, while microscope 27 is movably mounted on the member 25 so that the workpiece supported by workholder 17 may be viewed therethrough. Microscope 27 is adapted for movement relative to member 25 through rotation of a machine screw member 28 threadedly engaging a microscope support 29, which is guided for transverse movement by means of rails 30 and 31.

The support 10 is also formed of a dovetail groove 33 within which is mounted a movable bed 34. Movement of the bed 34 is likewise effected by a screw and crank arrangement 35. The bed 34 supports a motor 36, which is mechanically connected to an abrading member 37 for driving the same. The bed 34 is further provided with a dovetail channel 38 at right angles to the dovetail channel 33 to permit movement of the abrading apparatus in two directions. The motor 36 and the grinding wheel 37 may be moved within channel 38 by manipulation of the screw and crank combination 39 having operative engagement with the motor support 40.

A pair of tubes 41 and 42 are also provided for conducting light to the vicinity of the work pieces held within the workholders so that discrete parts of the work pieces may be viewed through the microscopes 26 and 27. The tubes 41 and 42 are supported in any suitable manner, not shown, and light is transmitted therethrough from any suitable source, not shown.

As hereinbefore mentioned, the task of machining an element which is designed to cooperate with a second element to form an assembly, in which the diemensional relationship between discrete portions of the elements is of paramount importance, has heretofore resulted in insurmountable difficulties. It was a tedious and time consuming operation for the skilled machinist to obtain the required dimensional precision with the usage of conventional machine apparatus. Moreover, even the skilled machinist is liable to err, thereby materially increasing the cost of the finished assembly by reason of the high rate of rejections thereon. Modern practice dictates the necessity of providing apparatus which does not rely upon the skills of the operator more than is absolutely necessary if quantity production is to be achieved in the field of precision assemblies. The present invention provides apparatus which enables the production of precision assemblies of the character described without relying upon the extraordinary skill of the machinist.

Figure 2:
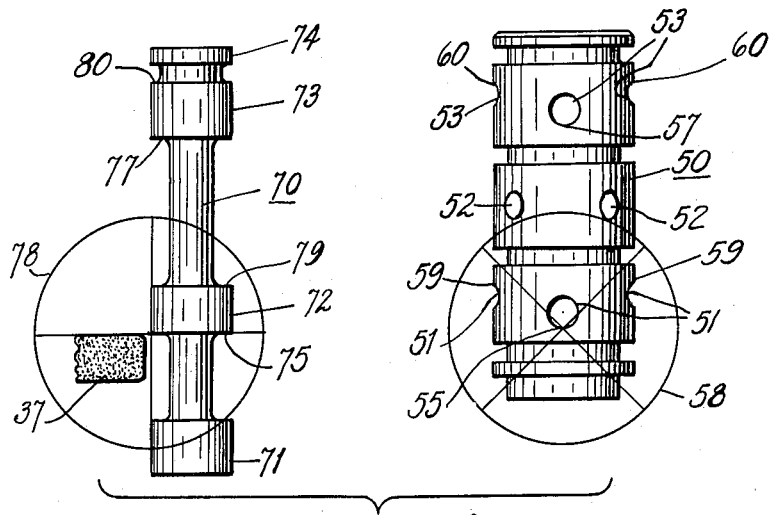
Figs. 2 and 3 are plan views of a pair of elements, one of which is to be machined, the elements having superimposed thereon the cross hairs of a pair of microscopes to illustrate the mode of operation.
Figure 3:
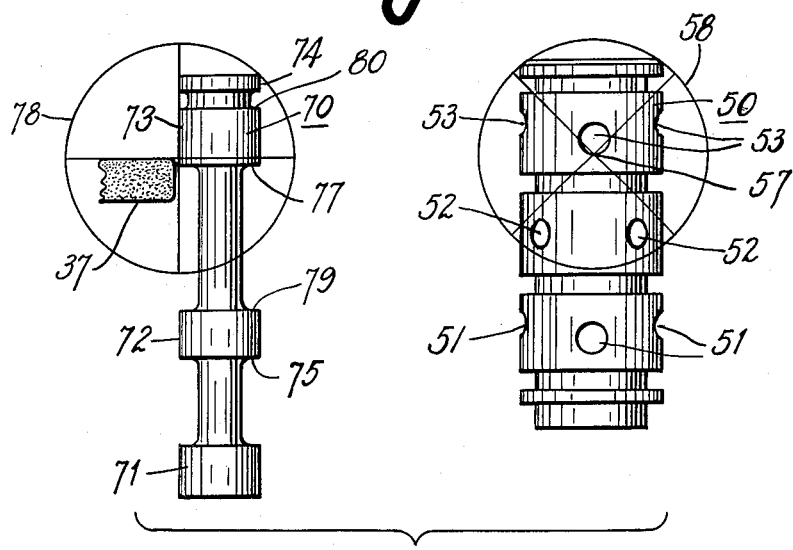

Referring particularly to Figs. 2 and 3, the method of operation of the apparatus hereinbefore described will be discussed in conjunction with manufacture of hydraulic valve assemblies including a cylinder 50 and a piston 70. The cylinder 50 is provided with a through bore within which the piston 70 is adapted to be housed for reciprocal movement therein. The cylinder 50 is provided with a plurality of axially spaced sets of ports 51, 52 and 53. Each of the several sets of ports comprise a plurality of circumferential spaced openings of circular configuration. The piston 70 is formed with a plurality of lands 71, 72, 73 and 74, the lands 72 and 73 of which are to cooperate with the sets of ports 51 and 53, respectively, in the valve assembly herein disclosed including the cylinder 50 and the piston 70. The set of ports 52 is used to supply hydraulic fluid medium to the annular channel existing between the lands 72 and 73. The sets of ports 51 and 53 are control ports from which fluid flows to the hydraulic apparatus with which the valve is used. To illustrate the problem involved, the edge 75 of the land 72 must be tangentially disposed with respect to the point 55 on the port 51 when the edge 77 of the land 73 is tangentially disposed with respect to the point 57 on the port 53 in the particular valve assembly illustrated. Thus, when the piston 70 is reciprocated within the cylinder 50, ports 51 and 53 will be uncovered coincidentally. This relationship is of paramount importance in order for the valve to function as a controlling unit with hydraulic precision equipment of the character used in fluid pressure controlled variable pitch propellers. Such a propeller is described and claimed in the Blanchard et al. Patents 2,307,101 and 2,307,102 wherein valve assemblies of this character are utilized to control the flow of fluid to and from the blade actuating servo motors. In this connection, it may be assumed that ports 53 are connected by tubing to one chamber of the servo motor and port 51 is connected by tubing of the other chamber of the servo motor, not shown. Thus, it is readily apparent that unless ports 51 and 53 are uncovered by lands 72 and 73 coincidentally, the servo motor will not respond by reason that either flow to or from opposite sides of the servo motor will be blocked by the misalignment of the ports and lands of the valve assembly. By following the teachings of the present invention, the desired dimensional relationship between the edges of the port openings may be easily obtained.

The circle 58 superimposed on the cylinder 50 represents the microscope 27 of Fig. 1, while the circle 78 superimposed on the piston 70 represents the microscope 26 of Fig. 1. In the instant method each valve assembly is manufactured as a unit and the piston is adapted to cooperate with a particular cylinder, which is used as a template in the operation to be described. The cylinder 50 is mounted as the work piece within the workholder 17, while the piston 70 is mounted as the work piece within workholder 16. The operator then adjusts the machine bed 13 so that the cross hairs of the microscope 26 coincide with the edge 75 of land 72. Thence, the operator adjusts the workholder 17 by manipulation of the screw 19 and the vernier adjustment of the microscope 27 through the screw device 28 so that the cross hairs of the microscope 27 coincide with the point 55 of the port 51, as is shown in Fig. 2. After this step, the workholder 17 and the microscope 27 are retained in fixed position with respect to the workholder 16 and the microscope 26, respectively. The operator then manipulates the screw device 14 by means of the crank 15 to move the bed 13 relative to the microscopes 26 and 27 whereupon the workholders 16 and 17 carrying their work pieces are moved throughout exactly the same distance until the operator cites point 57 on port 53 through the microscope 27. When point 57 coincides with the intersection of the cross hairs of the microscope 27, the operator sights the microscope 26 to determine where the edge 77 of the land should be to obtain dimensional exactitude between the reference points on the cylinder and the corresponding reference points on the piston. The operator may then adjust the grinding wheel by operation of the screw devices 35 and 39 to bring the wheel 37 into alignment with the cross hairs of the microscope 26, after which the motors 20 and 36 may be energized from a source of power, not shown, and the edge 77 of land 70 may be machined so that the distance between the edges 75 and 77 of the lands 72 and 73 is exactly equal to the distance between the points 55 and 57 of the ports 51 and 53. The operator may then establish a second reference indicia, namely point 59 of ports 51 and edge 79 of land 72, in a similar manner as the reference indicia of point 55 and edge 75 were located, and thereafter, machine the distance between edge 79 of land 72 and edge 80 of land 72 to dimensional equality with point 59 on ports 51 and point 60 on ports 53.

In some instances it may be desirable to machine the piston lands so that they overlap port openings of the cylinder by a predetermined amount. In this instance the microscope 26 must be adjusted relative to the microscope 27 to obtain the desired amount of overlap, but in any eventuality the apparatus herein disclosed will enable the manufacture of precision valve assemblies wherein the dimensional tolerances must be of extremely small magnitude. While the method has been disclosed in conjunction with precision valve assemblies, it is to be understood that the device is capable of other adaptations wherein exactitude in dimensional relationships is of importance.

While the embodiment of the present invention as herein disclosed, constitutes a preferred form, it is to be understood that other forms might be adopted.

What is claimed is as follows:

1. Apparatus for precision machining an article which is designed to cooperate with a particular element including in combination, first sight means for locating reference indicia on said element, second sight means for locating corresponding reference indicia on said article, means to support the article and element so that the first reference indicia on the element and article can be located by said first and second sight means, means operatively connected with said article and element for simultaneously moving them relative to said first and second sight means to locate second reference indicia on the element and article by said first and second sight means, and means associated with said article after it is so moved for machining portions of the same to obtain a predetermined dimensional relationship between the reference indicia of the article and the reference indicia of the element.

2. Apparatus for precision machining an article which is designed to cooperate with a particular element including in combination, supporting means for said article, supporting means for said element, first sight means for locating reference indicia on said element, second sight means for locating corresponding reference indicia on said article, means mounting said supporting means for coincident movement relative to said first and second sight means so that in one position of said article and element first reference indicia may be located and in another position of said article and element second reference indicia may be located, and means associated with said article after it is moved to said other position for machining a portion of the same to obtain a predetermined dimensional relationship between the reference indicia on said article and the reference indicia on said element.

3. Apparatus for grinding the edges of lands on a piston designed to cooperate with a particular ported cylinder to form a valve assembly, including in combination, a workholder for supporting the cylinder, a workholder for supporting the piston, first sight means for locating the edges of cylinder ports, second sight means for locating the edges of piston lands, means mounting the workholders for longitudinal movement relative to the first and second sighting means, and a longitudinally adjustable grinding wheel engageable with said piston whereby the distances between the edges of said lands are formed to have a predetermined relationship to the distances between the edges of said ports.

4. The combination set forth in claim 3 wherein the workholder for supporting the cylinder is movable relative to the workholder supporting the piston whereby an edge of one of the cylinder ports may be moved to coincide with the edge of one of the piston lands to serve as reference indicia for the valve assembly.

5. Apparatus for precision machining an article which is designed to cooperate with a particular element including in combination, supporting means for said article, supporting means for said element, first sight means for locating reference indicia on said element, second sight means for locating corresponding reference indicia on said article, means mounting said supporting means for coincident movement relative to said first and second sight means, means associated with the supporting means for said article and operatively connected with said article for effecting rotation of the said article about its axis, and means including a longitudinally adjustable abrading device associated with said article while it is rotating for machining a portion of the same to obtain a predetermined dimensional relationship between the reference indicia on said article and the reference indicia on said element.

6. In a machine for grinding the edges of lands on a piston designed to cooperate with a particular ported cylinder to form a valve assembly, the combination including, a longitudinally adjustable rotatable grinding wheel, supporting means for the cylinder, supporting means for the piston, first sight means for locating the edges of cylinder ports, second sight means for locating the edges of piston lands, means mounting the supporting means for coincident movement relative to the first and second sighting means, and means operatively associated with said grinding wheel for moving the same into engagement with said piston whereby the distances between the edges of said lands are formed to have a predetermined dimensional relationship to the distances between the edges of said ports.

7. In a machine for grinding the edges of lands on a piston designed to cooperate with a particular ported cylinder to form a valve assembly, the combination including, a longitudinally adjustable rotatable grinding wheel, supporting means for the cylinder, supporting means for the piston, first sight means for locating the edges of cylinder ports, second sight means for locating the edges of piston lands, means mounting the supporting means for coincident movement relative to the first and second sighting means, means associated with the supporting means for said piston and operatively connected to said piston for effecting rotation thereof, and means operatively associated with said grinding wheel for moving the said grinding wheel into engagement with said rotating piston whereby the distances between the edges of said lands are formed to have a predetermined dimensional relationship to the distances between the edges of said ports.

8. In a method of precision machining an article which is designed to cooperate with a particular element to form an assembly, the steps comprising sighting a first reference point on the article, adjusting the position of the element and sighting a corresponding first reference point on said element, simultaneously moving the article and the element through the same distance with the article and element in fixed relation to each other and sighting second reference points on the article and element, moving a cutting tool so that an edge thereof coincides with the second reference point on the article while maintaining sighting of first and second reference points on the article and element fixed, the moving of the cutting tool causing complete fixed alignment of said cutting tool for finished machining and precluding further sighting for alignment during machining prior to cutting tool actuation, and actuating the cutting tool to machine the article so that the distance between the first and second reference points on the article has a predetermined dimensional relationship to the distance between the first and second reference points on the element.

9. In a method of precision machining an article which is designed to cooperate with a particular element to form an assembly, the steps comprising sighting a first reference point on the article, adjusting the position of the element and sighting a corresponding first reference point on said element, simultaneously moving the article and the element longitudinally through the same distance while maintaining the article and the element in fixed relation to each other in parallel alignment and sighting second reference points on the article and the element, moving a cutting tool so that an edge thereof coincides with the second reference point on the article while maintaining sighting of first and second reference points on the article and element fixed, the moving of the cutting tool causing complete fixed alignment of said cutting tool for finished machining and precluding further sighting for alignment during machining prior to cutting tool actuation, and actuating said cutting tool to machine the article so that the distance between the first and second reference points on the article coincides exactly with the distance between the first and second reference points on the element.

10. In the manufacture of a valve assembly including a cylinder having a plurality of axially spaced ports and a piston having a plurality of axially spaced lands, the steps comprising sighting an edge of a first land on said piston, adjusting the longitudinal position of the cylinder and sighting a cooperable edge of a first port therein, simultaneously moving the piston and the cylinder through the same longitudinal distance with the cylinder and the piston in fixed relation to each other and sighting the edge of a second port in said cylinder and a line where the cooperable edge of a second land on said piston should be, moving a cutting tool so that an edge thereof coincides with said line while maintaining sighting of the first and second ports of the cylinder and sighting of cooperable edges on said piston fixed, the moving of the cutting tool causing complete fixed alignment of said cutting tool for finished machining and precluding further sighting for alignment during machining prior to cutting tool actuation, and actuating said cutting tool to machine said second land on said piston so that the distance between the edges of said first and second lands on said piston has a predetermined dimensional relationship to the distance between the cooperable edges of the first and second ports in said cylinder.

11. In the manufacture of a valve assembly including a cylinder having a plurality of axially spaced ports and a piston having a plurality of axially spaced lands, the steps comprising mounting said piston and said cylinder in spaced parallel planes, sighting the edge of the first land on said piston, adjusting the longitudinal position of said cylinder and sighting the cooperable edge of the first port in said cylinder, simultaneously moving the piston and the cylinder through the same longitudinal distance while maintaining the cylinder and piston in fixed relation to each other in said spaced parallel planes and sighting the edge of a second port on said cylinder and a line where the cooperable edge of a second land on said piston should be, moving a cutting tool so that an edge thereof coincides with said line while maintaining sighting of the first and second cylinder port edges and cooperable piston land edges fixed, the moving of the cutting tool causing complete fixed alignment of said cutting tool for finished machining and precluding further sighting for alignment during machining prior to cutting tool actuation, and actuating said cutting tool to machine said piston so that the distance between the edges of the first and second lands on said piston coincides exactly with the distance between the cooperable edges of the first and second ports in said cylinder.

References Cited in the file of this patent
UNITED STATES PATENTS

| Number | Name | Date |
|---|---|---|
| 354,740 | Rogers | Dec. 21, 1886 |
| 793,094 | Primrose | June 27, 1905 |
| 1,332,437 | Ely | Mar. 2, 1920 |
| 1,907,469 | Thomson | May 9, 1933 |
| 1,991,231 | Shiffman | Feb. 12, 1935 |
| 2,446,575 | Cooke | Aug. 10, 1948 |
| 2,460,232 | Michelsen et al. | Jan. 25, 1949 |
| 2,528,295 | Balsiger et al. | Oct. 31, 1950 |
| 2,559,431 | Hollengreen et al. | July 3, 1951 |

FOREIGN PATENTS

| Number | Country | Date |
|---|---|---|
| 553,594 | Great Britain | May 27, 1943 |